Patented Apr. 22, 1947

2,419,281

UNITED STATES PATENT OFFICE 2,419,281

POLYVINYL ALCOHOL FILM

Max Vernon Noble, Kenmore, N. Y., assignor to E. I. du Pont de Nemours & Company, Wilmington, Del., a corporation of Delaware No Drawing. Application December 12, 1944, Serial No. 567,893

1 Claim. (Cl. 260—90)

This invention relates to the manufacture of films of polyvinyl alcohol, and more particularly to the stripping from the casting surface of sheets or films of polyvinyl alcohol formed by the evaporative- or dry-casting process.

The term "polyvinyl alcohol" appearing hereinafter is employed in its accepted trade sense and denotes the water-soluble types of partially saponified and fully saponified polyvinyl acetate.

In the formation of continuous films of soluble film-forming material such as polyvinyl alcohol, it is the conventional practice to flow a film of a solution of the film-forming material (this solution is generally referred to as the "dope") onto the casting surface, for example, a metal wheel or belt, cause the solvent to be substantially completely removed from the liquid film whereby to form a substantially dry self-supporting film, and to strip the resulting film from the casting surface.

The continuous casting of films of polyvinyl alcohol from aqueous solutions of the polymer presents two major difficulties: (1) the dope or solution does not wet the metal surface of the wheel or belt evenly, and unless an even application of the dope is secured the resulting film is non-uniform in gauge and appearance; (2) the substantially dry film adheres so tenaciously to the metal casting surface that it is frequently stretched, deformed or even torn at the point of stripping.

To overcome these difficulties it has been proposed to incorporate in the casting dope a wetting agent to promote even application of the dope on the casting surface, and also to incorporate in the dope a substance (hereinafter termed "stripping agent") which facilitates stripping of the dried film from the casting surface. However, many of the wetting agents impart undesirable haze to the film and many of the stripping agents do not permit the film to be stripped from a hot surface which necessitates cooling the surface at the stripping point, thus reducing the effective drying area of the casting surface with a resultant relative decrease in the speed of film production. Moreover, the necessity for adding separate agents to improve wetting and stripping characteristics entails added steps and expense which is, of course, a serious disadvantage from the commercial standpoint.

Therefore, an object of this invention is to provide a single agent which will satisfactorily perform the functions of a wetting agent and a stripping agent in the manufacture of polyvinyl alcohol film to the end that there is produced, simply and without loss of efficiency, a strong, clear, transparent, flexible film or sheet of polyvinyl alcohol free of surface imperfections or blemishes, and having a uniform thickness.

A further object is to provide a substance which when added to a polyvinyl alcohol film-casting dope in small amounts will improve the wetting characteristics of the dope and facilitate stripping of the substantially dry film from the heated surface.

A still further object is to provide a polyvinyl alcohol film-casting dope which will wet the metal casting surface evenly to form a uniform, clear, transparent, flexible film which is easily stripped from the hot casting surface.

These and other objects will more clearly appear hereinafter.

I have found that, unexpectedly, cetyl dimethyl benzyl ammonium chloride when added to aqueous film-forming solutions of polyvinyl alcohol markedly improves the wetting property of the solution, and in addition imparts excellent stripping characteristics to the dried film so that the film is easily stripped from either hot or cold casting surfaces, and this without in any way deleteriously affecting the quality of the film.

Cetyl dimethyl benzyl ammonium chloride is a non-toxic, odorless, and colorless solid which is commercially available under the trade-name Triton K-60 (Rohm & Haas). It has no harmful effect upon polyvinyl alcohol.

Substantial improvement in both wetting and stripping is obtained by adding as little as 0.1% by weight, based on the total weight of solids, of cetyl dimethyl benzyl ammonium chloride to the polyvinyl alcohol casting dope, while 10% constitutes the practical upper limit from the standpoint of economy. Preferably this compound should be used in amounts ranging from 1% to 3% for best results.

From the following specific examples, in which are disclosed certain embodiments of the invention as well as details of what is believed to be the best mode for carrying out the invention, it will be apparent how the foregoing objects and related ends are accomplished. Parts and percentages are by weight unless otherwise indicated.

Example I

Polyvinyl alcohol (substantially completely saponified polyvinyl acetate) was dissolved in hot (80°–100° C.) water to form a 15% solution. To this solution was added 1.0% (based on the polyvinyl alcohol) of cetyl dimethyl benzyl ammonium chloride. A film of the resulting solution was cast on a clean stainless steel casting surface maintained at 65°–68° C. The even flow of the solution on the metal surface was proof of the excellent wetting power of the solution. The dried film was easily stripped from the hot stainless steel casting surface; was free of haze and surface imperfections and had a uniform thickness of 0.0020 of an inch.

Film cast from the same solution minus the wetting-stripping agent of this invention, could not be successfully stripped from the stainless steel casting surface until the latter had been cooled to room temperature and even then a considerable pull was required to separate the film from the casting surface.

*Example II*

A film 0.0020 of an inch thick was cast as in the previous example but the casting surface was cooled to room temperature before the film was stripped therefrom. The force required to strip the film from the cooled surface at a constant rate and at an angle of 90° was 175 grams. In contrast, a pull of 2000 grams was required to strip a film of polyvinyl alcohol not containing the cetyl dimethyl benzyl ammonium chloride, formed under otherwise identical conditions.

*Example III*

Polyvinyl alcohol (85% hydrolyzed) was dissolved in water to a 15% concentration and to this solution was added 1% (based on the polyvinyl alcohol of cetyl dimethyl benzyl ammonium chloride. The dope so prepared was cast as in the preceding examples. The film produced was free from haze and was easily stripped from a hot surface without tearing and without any undue strain on the film. A pull of 1000 grams was required to strip the film from the casting surface cooled to room temperature. In comparison, film cast from untreated dope of the same polyvinyl alcohol in the same concentration could not be stripped from a hot surface, and a 2000 gram pull was required to separate it from the cooled casting surface; in addition, the wetting action of the dope was wholly unsatisfactory.

The invention has been described hereinabove with specific reference to the casting of polyvinyl alcohol film. However, it is not so limited but comprehends rather the casting of film of any polymeric water-soluble film-forming polymers capable of being dry-cast, such as the water-soluble varieties of polyvinyl acetals, starch, casein, etc. Moreover, there may be incorporated in the film-forming composition, plasticizing agents or softeners, for enhancing the flexibility of the film, as well as dyes, pigments, moisture-proofing agents, flameproofing agents, insolubilizing agents, and/or other conventional modifying agents.

This invention enables the production of film in an economical, speedy and facile manner, and is of especial advantage in the continuous casting of film. A further advantage resides in the fact that the treatment in accordance with the principles of this invention imparts neither color nor odor to the film, nor does it render the film toxic. In short, the treatment has no harmful effect on the film which in the matter of uniformity, clarity, and freedom from surface defects and blemishes is, in general, superior to polyvinyl alcohol films heretofore producible.

As many apparently widely different embodiments of this invention may be made without departing from the scope and spirit thereof, it is to be understood that this invention is not limited to the specific embodiments thereof except as defined in the appended claim.

I claim:

A self-sustaining film of polyvinyl alcohol containing from 0.1% to 10% by weight of cetyl dimethyl benzyl ammonium chloride, based on the weight of polyvinyl alcohol.

MAX VERNON NOBLE.

REFERENCES CITED

The following references are of record in the file of this patent:

UNITED STATES PATENTS

| Number | Name | Date |
|---|---|---|
| 2,162,618 | Izard | June 13, 1939 |
| 2,340,311 | Donovan | Feb. 1, 1944 |
| 2,271,468 | Watkins | Jan. 27, 1942 |